United States Patent
Yarkosky et al.

(10) Patent No.: US 7,162,261 B1
(45) Date of Patent: Jan. 9, 2007

(54) METHOD AND DEVICE FOR IDENTIFYING ANTENNAE TO TRANSMIT WIRELESS SIGNALS

(75) Inventors: Mark Yarkosky, Overland Park, KS (US); John Pope, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 431 days.

(21) Appl. No.: 10/083,933

(22) Filed: Feb. 27, 2002

(51) Int. Cl.
*H04B 7/00* (2006.01)
*H04Q 7/20* (2006.01)

(52) U.S. Cl. .............. 455/513; 455/13.3; 455/69; 455/101; 455/103; 455/277.1; 455/404.2; 455/456.1; 455/562.1; 455/575.7; 455/522

(58) Field of Classification Search ........... 455/513, 455/562.1, 101, 69, 103, 442, 13.3, 277.1, 455/404.2, 456.1, 561, 575.7, 522; 375/299
See application file for complete search history.

(56) References Cited

U.S. PATENT DOCUMENTS

| | | | | |
|---|---|---|---|---|
| 5,812,935 A * | 9/1998 | Kay | ........................ | 370/333 |
| 5,970,061 A * | 10/1999 | Kokudo | ........................ | 370/344 |
| 6,006,075 A * | 12/1999 | Smith et al. | ................. | 455/101 |
| 6,035,218 A * | 3/2000 | Oh et al. | ................. | 455/562.1 |
| 6,917,597 B1 * | 7/2005 | Schmidl et al. | ............. | 370/280 |
| 6,959,048 B1 * | 10/2005 | Horneman et al. | ......... | 375/299 |
| 2002/0132600 A1 * | 9/2002 | Rudrapatna | ............... | 455/277.1 |
| 2003/0017835 A1 * | 1/2003 | Bergel | ........................ | 455/502 |
| 2003/0032453 A1 * | 2/2003 | Katz et al. | ................... | 455/562 |
| 2003/0114193 A1 * | 6/2003 | Kavak et al. | ................ | 455/562 |

* cited by examiner

*Primary Examiner*—Matthew D. Anderson
*Assistant Examiner*—Shaima Q. Aminzay

(57) ABSTRACT

A method and system for optimizing the use of antennae in a CDMA distributed antenna system. A pathway manager may identify and select an optimal antenna to transmit a wireless signal from a BTS to a receiver. The non-selected antennae may be disabled from transmitting signals to the receiver by suppressing the Walsh code and PN offsets of the BTS and receiver. The pathway manager may use criteria such as availability, proximity, reliability, and strength of signals and antennae to select an optimal antenna. Communications between the receiver and the antennae may be used to determine such criteria. By selecting an optimal antenna, the pathway manager may conserve energy from a BTS and reduce power requirements for an antenna system.

11 Claims, 10 Drawing Sheets

METHOD AND DEVICE FOR IDENTIFYING ANTENNAE TO TRANSMIT WIRELESS SIGNALS

FIELD OF INVENTION

The present invention is directed toward distributed antenna systems and, more particularly, to a system and method for targeting transmit and receive capabilities to an antenna closest to a subscriber transceiver.

BACKGROUND OF INVENTION

Wireless communication is an increasingly popular means of personal communication in the modern world. People are using wireless networks for the exchange of voice and data as an alternative to using a wire infrastructure. In principle, a user can seek information over the Internet or call anyone over a Public Switched Telephone Network (PSTN) from any place inside the coverage area of the wireless network.

With the increase of the popularity of wireless communications, many of the uses for a wire infrastructure are being replaced by wireless infrastructures. For example, a traditional wire infrastructure PBX may be replaced by a wireless PBX to route phone calls and Internet connections inside a building or in an office. A wireless PBX may take advantage of wireless communication techniques.

A wireless communications technique commonly used to allow multiple users on the same channel is code division multiple access (CDMA). CDMA permits multiple users to use the same wireless communication channel at the same time, which allows the network infrastructure to support more wireless users. Some of the benefits of CDMA are improved call quality, simplified system planning through the use of the same frequency in every sector of every cell, enhanced privacy, improved coverage characteristics, increased talk time for portables, and increased bandwidth.

CDMA utilizes the radio spectrum by allowing multiple users to share the same physical channel. In CDMA, multiple users occupy the same frequency at the same time. Consequently, frequency and time are not used to discriminate between users. Instead, CDMA separates multiple users using the same channel through the use of codes. The receiver in the CDMA system typically receives a waveform that consists of a mixture of signals from several users. The system then uses coding to discriminate between the signals received from the multiple users on the same frequency channel at the same time.

CDMA is a type of spread spectrum communication technique known as Direct Sequence Spread Spectrum (DSSS). In this approach, a narrowband data signal from a user is spread through the use of a broadband code that is unique to the user in order to create a broadband signal for transmission. The broadband signal is then transmitted on a frequency that may also be used by other users. When a receiver receives the broadband signal, it uses the user's unique code to recover the user's narrowband data signal from the mixture of signals encountered by the receiver.

In CDMA, each bit of the user's narrowband signal is divided into a number "m" of short intervals called chips. Each bit is typically broken down into from 64 to 128 chips. One chip corresponds to 801 feet or 244.14 m; 1 mile is 6.6 chips; and 1 km is 4.1 chips. Signals that correspond to 1 chip apart from each other have been received 640 milliseconds apart from each other due to the propagation speed of the radio waves. Each transmitting user is assigned a unique chip pattern or sequence that is, in effect, that user's code channel. Using this unique sequence, the user's transmitted signal will be distinguishable by a receiver from other signals using the same physical channel. Other user's code patterns will appear random to the receiver and will integrate in a random self-canceling fashion such that they do no disturb the bit decoding decision being made with the selected user's code pattern.

In a CDMA distributed antenna system, a number of antenna elements at different locations may simultaneously communicate on the same frequency and same channel (e.g., same Pseudonoise (PN) Offset and same Walsh code) with a given receiver. The PN offset is used primarily for signal spreading. A short PN code may identify cell sites or sectors of cells, and a long PN code may be used for spreading and scrambling a signal to provide privacy. A Walsh code contains 64 sequences, each 64 chips long. Each Walsh code is orthogonal to all other Walsh codes. A Walsh code's orthogonal nature prevents one code from interfering with other Walsh codes.

A common base transceiver station (BTS) or distributed antenna system controller (DAS) may power a group of distributed antennae used in a CDMA system. On both the forward link (communications from the base station to the receiver) and reverse link (communications from the receiver to the base stations), all of the antennas within the system may be in communication with the receiver.

Energy from a common BTS may be radiated via a DAS controller to a number of antenna elements distributed throughout an area, such as in a building for instance. A problem with this arrangement is that energy radiated via many of the antenna elements for communication with a mobile station or a receiver is largely wasted due to a redundancy of signals transmitted from the antennas within the system.

SUMMARY OF INVENTION

The present invention is directed to a method and system for reducing power consumption in a distributed antenna system by selectively powering antenna elements within a CDMA distributed antenna system. A method and system for optimizing the allocation of antennae in a CDMA distributed antenna system is presented as well. A pathway manager is provided for assigning the antennae within a distributed antenna system for the purpose of conserving energy radiated by the antennae and reducing power requirements. The energy conserved from each antenna and the proper allocation of each antenna may allow more receivers to operate at the same time, thereby enhancing the capabilities of the CDMA antenna system.

In a preferred embodiment, only one optimal antenna element is identified for use and assigned to each receiver. The optimal antenna element can be identified using several methods. The antenna element may be identified based on (i) reliability and probability of transmission, (ii) proximity of the antennae element to the receiver, (iii) incoming signal strength, and (iv) availability for use of the antennae element.

In another embodiment, the pathway manager identifies and selects an optimal antenna to transmit a wireless signal based on many factors alone or in combination. For example, the pathway manager may select an optimal antenna based on reliability, proximity to the receiver, signal strength, and availability either separately or in combination.

The factors that are considered may depend upon the type of antenna system in use or the factors considered may depend upon the importance of the wireless signal reliably arriving at a receiver.

In still another embodiment, the pathway manager is an independent entity of a wireless system. In another embodiment, the pathway manager is a combination of a BTS and a DAS. In this embodiment, the BTS and the DAS together have the responsibility of carrying out functions of the pathway manager. In yet another embodiment, the pathway manager is included within the BTS. In this embodiment, the functions of the pathway manager are performed by the BTS. In yet another embodiment, the pathway manager is included within the DAS. In this embodiment, the functions of the pathway manager may be performed by the DAS. In yet another embodiment, the pathway manager is included within a receiver. In this embodiment, the functions of the pathway manager are performed by receiver.

In still another embodiment, a method for transmitting wireless signals in a CDMA distributed antenna system is presented. A plurality of antennae may be provided, where each antenna is configured to transmit a wireless signal to a receiver. One of the plurality of antennae is identified to transmit the wireless signal to the receiver. Subsequently, the wireless signal is transmitted by the identified one of the plurality of antennae to the receiver.

In still another embodiment, a CDMA distributed antenna system is presented. A plurality of antennae are provided in the system, where each antenna is configured to transmit a wireless signal. A pathway manager is also provided that is coupled to the plurality of antennae. The pathway manager performs the task of identifying one of the plurality of antennae to transmit the wireless signal. Furthermore, a receiver is provided performing the task of receiving the wireless signal transmitted by the identified one of the plurality of antennae.

In still another embodiment, a method of optimizing transmission of wireless signals in a CDMA distributed antenna system is presented. A plurality of antennae are provided, where the plurality of antennae are configured to transmit wireless signals to a plurality of receivers. For each receiver, one of the plurality of antennae is selected to transmit the wireless signal to the receiver.

In still another embodiment, a pathway manager is presented. The pathway manager includes a processor, and an antenna database coupled to the processor. The antenna database includes information concerning each of the antennae within a plurality of antennae. The pathway manager also includes a data storage medium coupled to the processor, and an interface coupled to the processor. The interface is configured to communicate with the plurality of antennae. A set of machine language instructions is stored in the data storage medium executable by the processor in response to a request from a BTS to perform functions including accessing the antenna database to determine selection characteristics, such as reliability and proximity of antennae to a receiver, and identifying one of the plurality of antennae to transmit a wireless signal to the receiver based on the selection characteristics.

These, as well as other features and advantages of the present invention, will become apparent to those of ordinary skill in the art by reading the following detailed description, with appropriate reference to the accompanying drawings.

DESCRIPTION OF FIGURES

An exemplary embodiment of the present invention is described herein with reference to the drawings, in which.

DETAILED DESCRIPTION OF EXEMPLARY EMBODIMENTS

The present invention is directed to a method and system for reducing power consumption in a distributed antenna system by selectively powering antenna elements within a CDMA distributed antenna system. A method and system for optimizing the allocation of antennae in a CDMA distributed antenna system is presented as well. A pathway manager is provided for allocating the use of antennae within a distributed antenna system for the purpose of conserving energy radiated by the antennae and reducing power requirements. The energy conserved from each antenna, and the proper allocation of each antenna may allow more receivers to operate at the same time, thereby enhancing the capabilities of the CDMA antenna system.

Figure 1:
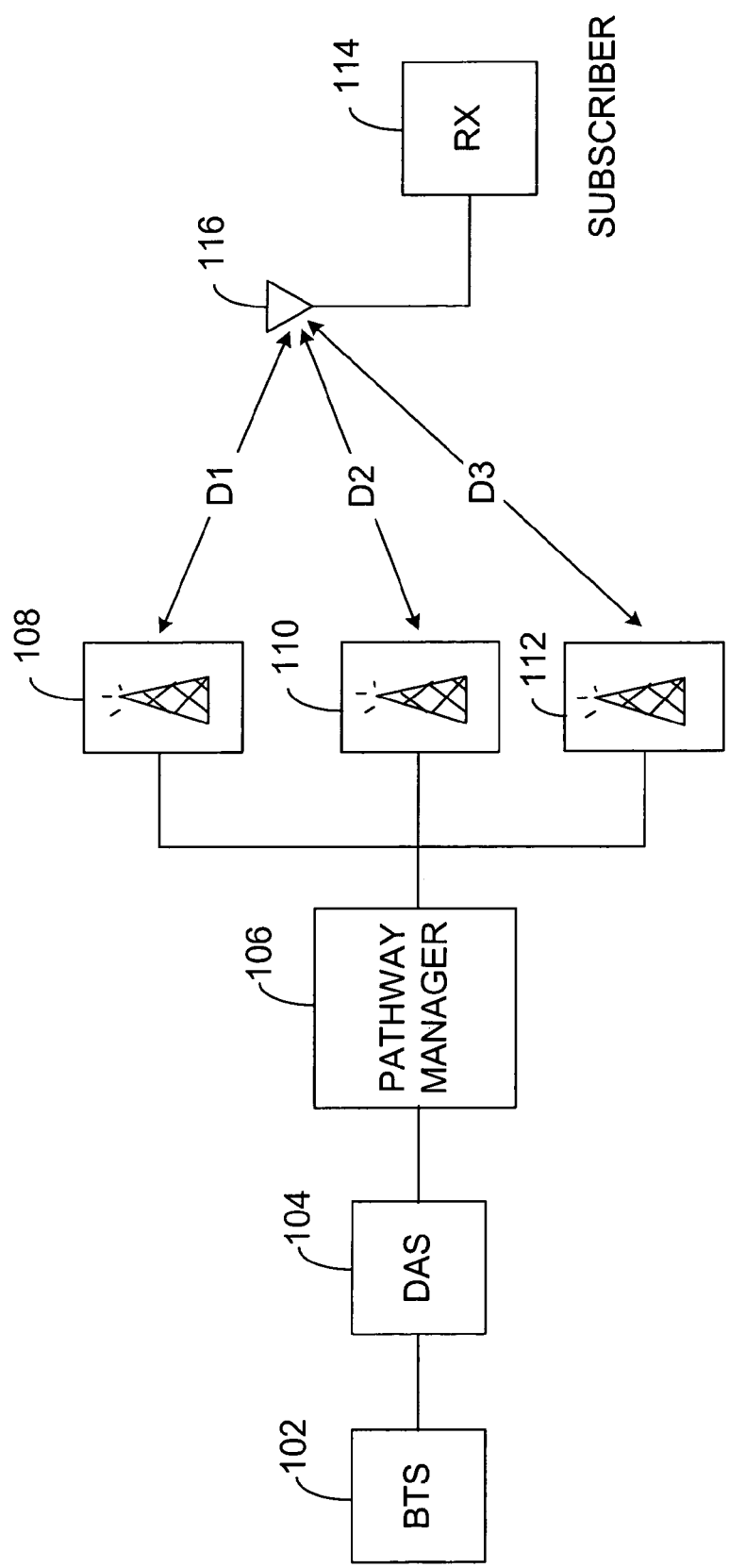
FIG. 1 is a wireless system arranged to operate in accordance with an exemplary embodiment of the present invention.

FIG. 1 is a functional block diagram illustrating a wireless system arranged to operate in accordance with an exemplary embodiment of the present invention. In FIG. 1, an antenna system is shown that includes a BTS 102, a DAS 104, and a pathway manager 106 for controlling a first antenna 108, a second antenna 110, and a third antenna 112 that may be used for transmitting signals to a receiver 114. An antenna system may contain more or less antennae than are presented in this embodiment. BTS 102 may be coupled to the antennae 108, 110, 112 in order to control the operations of the antennae 108, 110, 112. In one embodiment, receiver 114 is stationary, although those skilled in the art will recognize that receiver 114 may be a mobile receiver as well, such as a cellular telephone, a Personal Digital Assistant (PDA), or a wireless modem. The wireless signals from antennae 108, 110 and 112 are transmitted across an air interface to receiver 114. The receiver 114 is used to receive the transmitted signals. The receiver 114 includes an antenna 116 for receiving the transmitted signals. In this example, the antennae 108, 110 and 112 are located at distances D1, D2 and D3, respectively, from the receiver 114, which may cause interference between transmitted signals and a difference in arrival time or a delay of each of the signals transmitted by the antennae when the signals arrive at the receiver 114.

In one embodiment, DAS 104 distributes bi-directional receiver signals within a single band (e.g., 800/900 MHz) from BTS 102 over standard coaxial cables, and single mode fibers (SMF) to the remote antennae 108, 110, 112. Distances up to 20 km can be bridged with a system using a typical DAS. In a preferred embodiment, DAS 104 is used for signal coverage within a building complex. DAS 104 may also be used in combination with coverage into long road and rail tunnels as well as other areas normally inaccessible to RF signals. DAS 104 may include an active hub for central powering and alarm output to the BTS 102, and an amplifier for bi-directional signal amplification. Still other components may be available as well.

In one embodiment of the invention, the pathway manager 106 identifies one of the plurality of antennae within the CDMA distributed antenna system to be an optimal antenna to transmit wireless signals to the receiver 114. The optimal antenna may be selected upon receiving data or information to transmit to receiver 114. Alternatively, the optimal antenna may be selected on a rolling basis by continuously identifying an optimal antenna for use to transmit signals to receiver 114. The pathway manager may be a technician manually identifying and selecting an optimal antenna to transmit wireless signals to the receiver.

Figure 2:
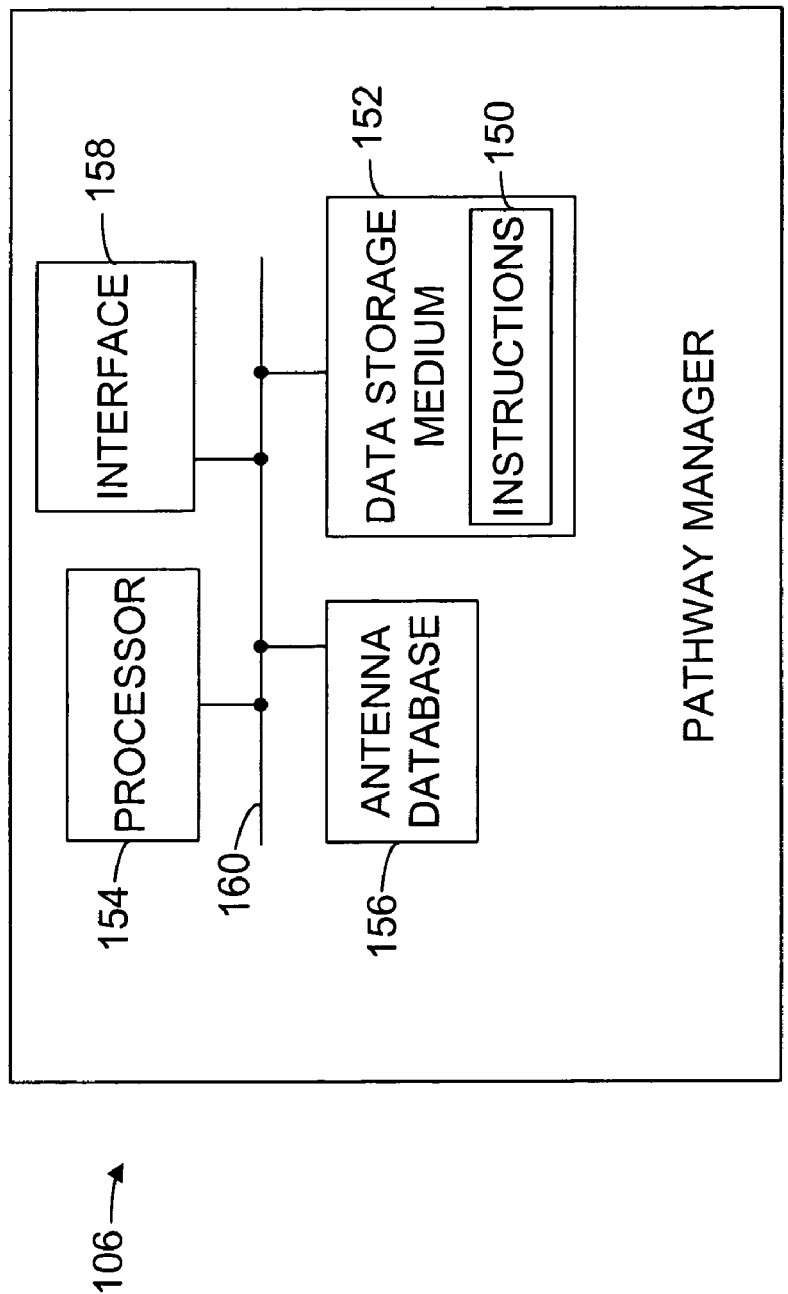
FIG. 2 is a pathway manager arranged to operate in accordance with an exemplary embodiment of the present invention.

FIG. 2 is a pathway manager arranged to operate in accordance with an exemplary embodiment of the present invention. The functions of the pathway manager 106 may be implemented within a set of machine language instructions 150 stored in a data storage medium 152 executable by a processor 154 in response to a request from BTS 102, DAS 104, or some other entity. The machine language instructions 150 may be written using any language operable to fulfill the necessary commands such as C, C++, or other programming languages. Examples of functions of the pathway manager 106 are identifying an optimal antenna, calculating a distance between an antenna and a receiver, determining the availability of antennae, and determining a wireless signal strength.

The pathway manager 106 may also have an antenna database 156 coupled to the processor 154 containing information of each antenna within the CDMA distributed antenna system. Such information may be signal transmission power capabilities of the antennae, and possible interference patterns of the CDMA distributed antenna system. Furthermore, such information may be selection characteristics such as availability of use of an antenna, reliability of antennae, and expected transmission signal strength from an antenna. The processor 154 may access the antenna database 156 when determining an optimal antenna for use to select an antenna with optimal characteristics. The pathway manager 106 also contains an interface 158 for communicating with the antennae. The interface 158 is coupled to the processor 154, the antenna database 156, and the data storage medium 152. The interface 158 may be a transmitter to communicate wirelessly with the antennae, or the interface 158 may be an interface card for communicating using coaxial cables, Ethernet cables, or T1 lines. The pathway manager 106 has a bus 160 connecting the interface 158, the processor 154, the data storage medium 152, and the antenna database 156.

Figure 3:
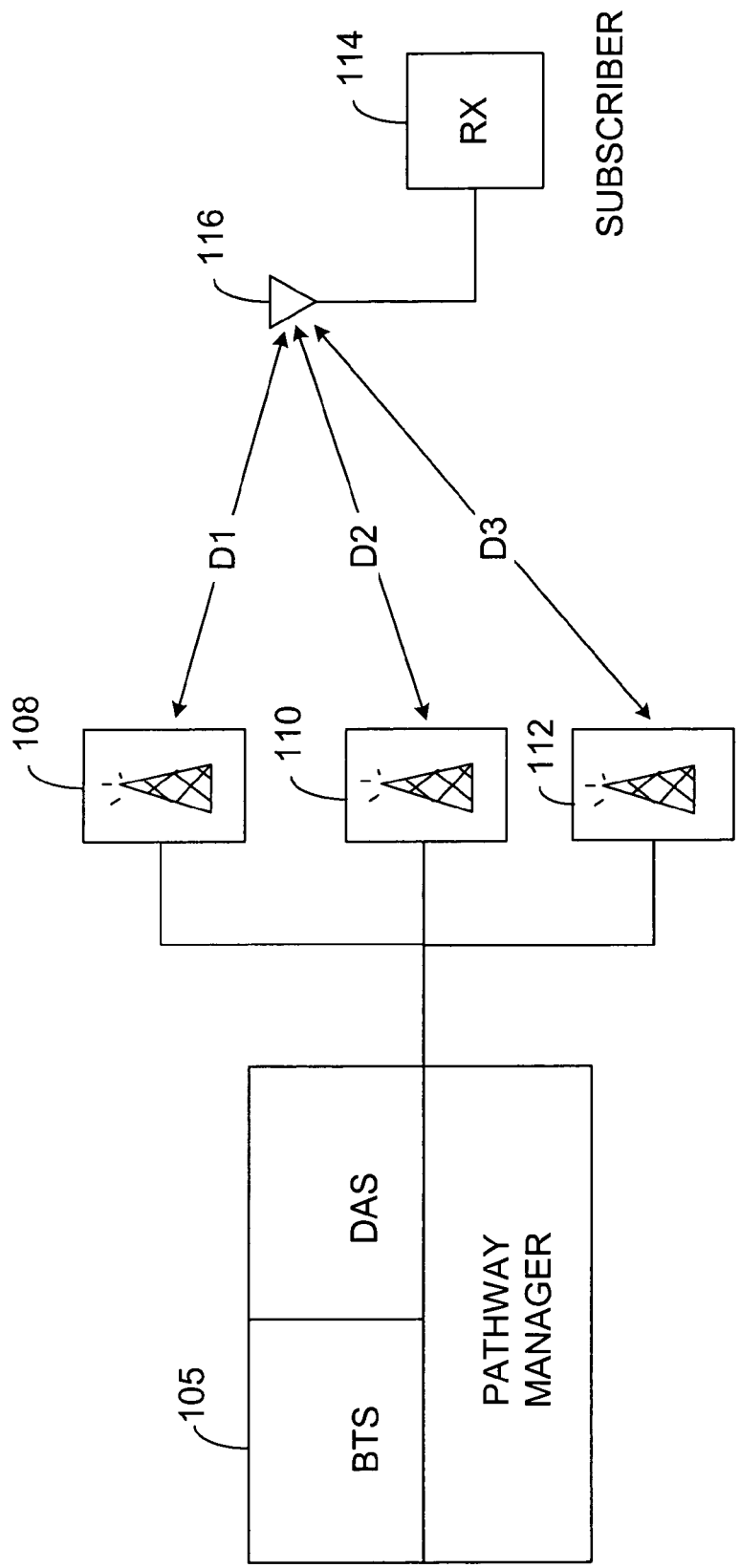
FIG. 3 is an alternative wireless system arranged to operate in accordance with an exemplary embodiment of the present invention.
Figure 4:
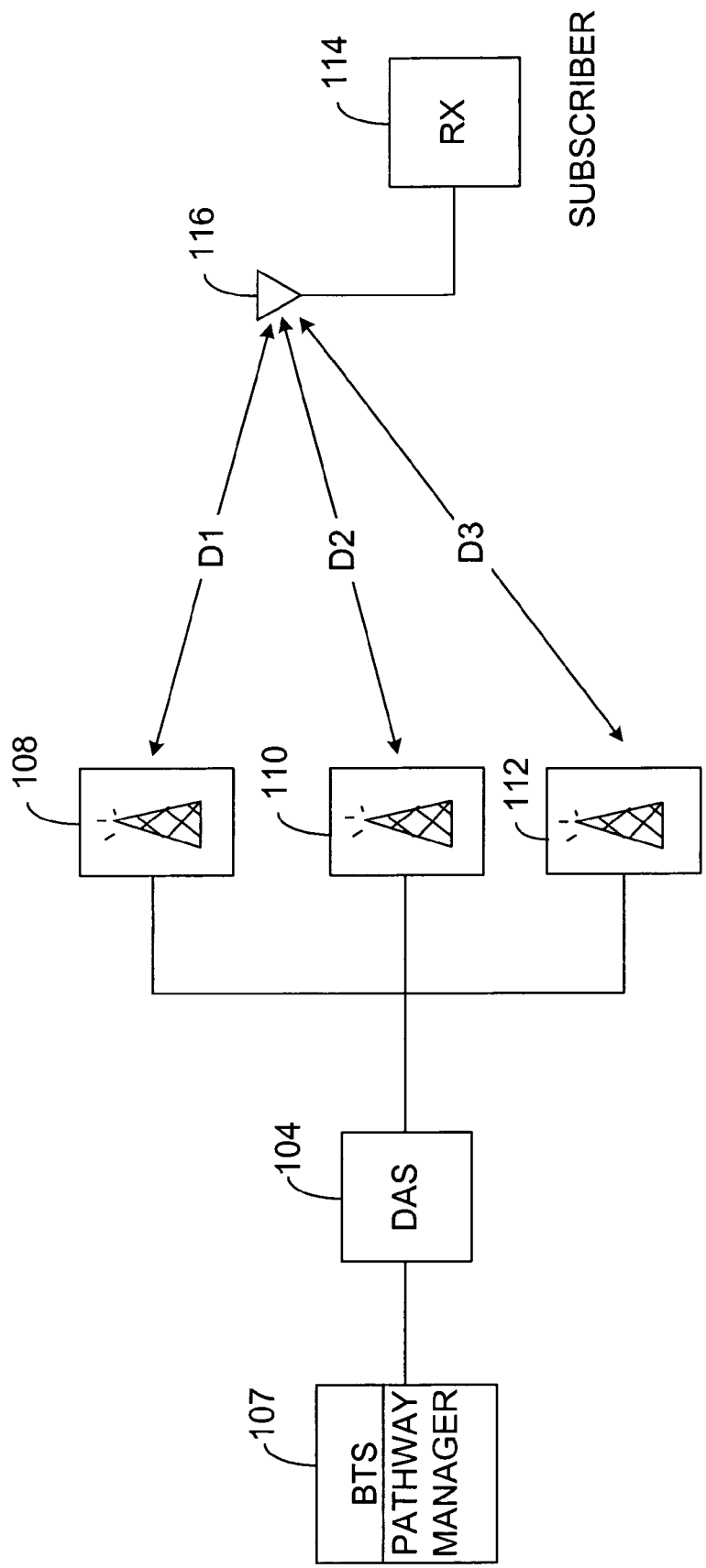
FIG. 4 is another alternative wireless system arranged to operate in accordance with an exemplary embodiment of the present invention.
Figure 5:
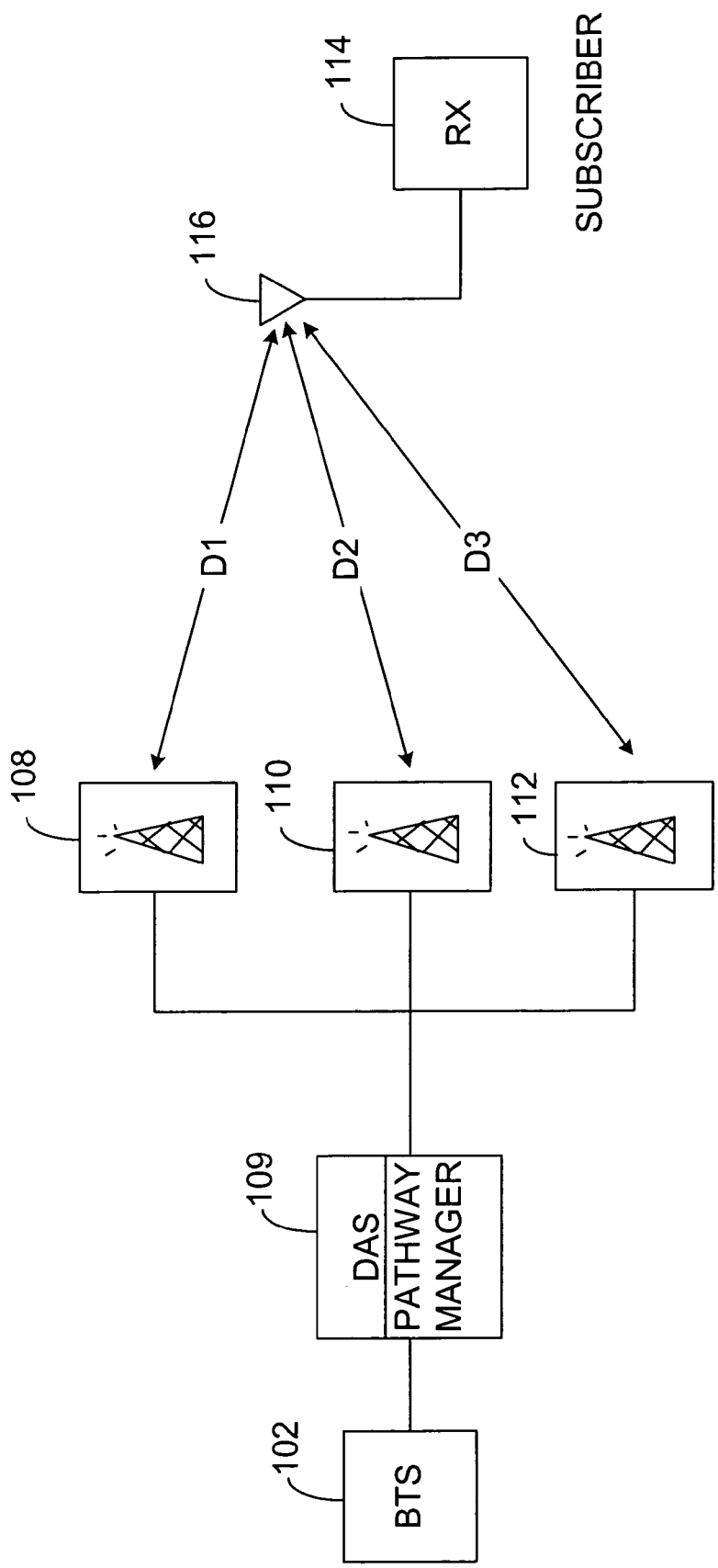
FIG. 5 is another alternative wireless system arranged to operate in accordance with an exemplary embodiment of the present invention.
Figure 6:
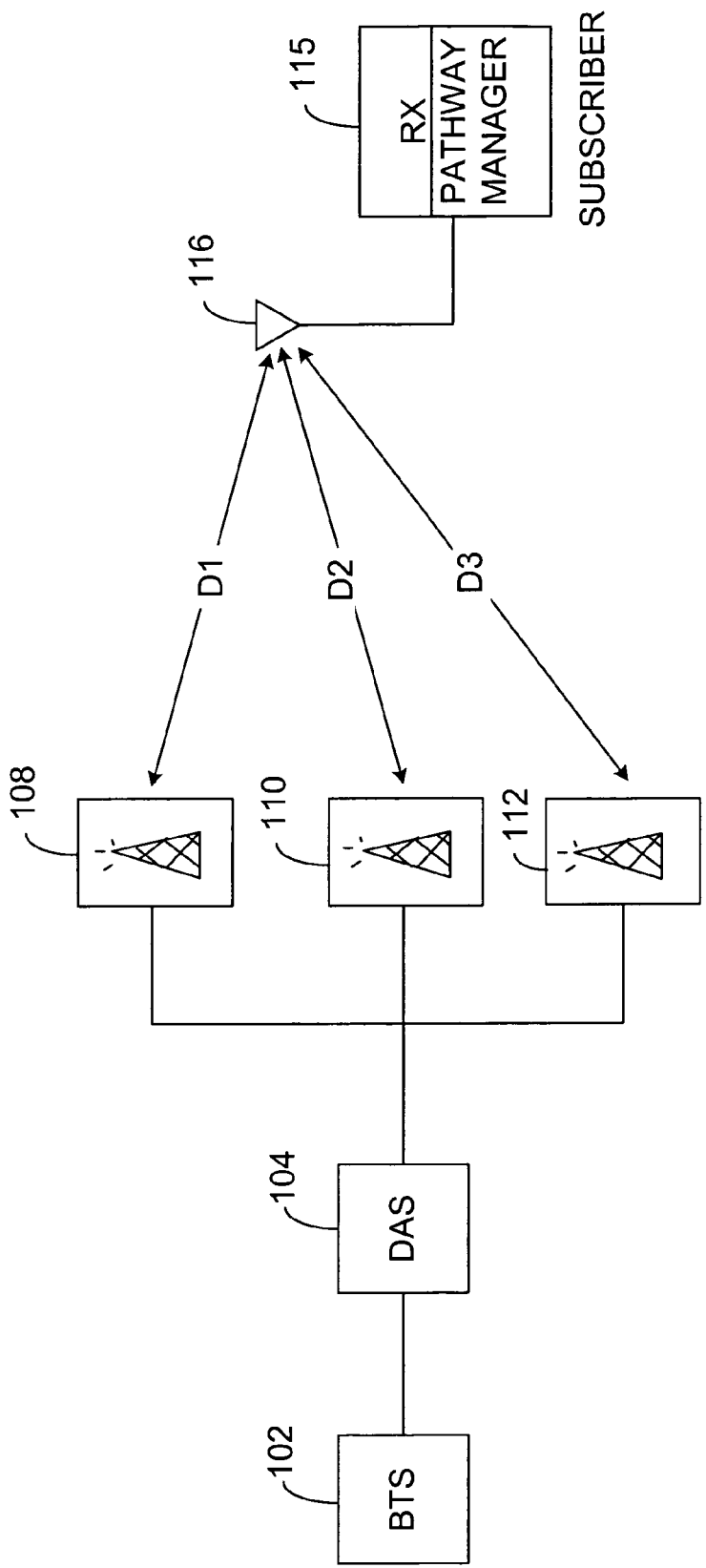
FIG. 6 is another alternative wireless system arranged to operate in accordance with an exemplary embodiment of the present invention.

The pathway manager 106, as shown in FIG. 1, may be an independent entity of the wireless system. In another embodiment, the functions of the pathway manager are performed by another entity. FIG. 3 is an alternative wireless system arranged to operate in accordance with an exemplary embodiment of the present invention. A managing device 105 is provided as a combination of a BTS, a DAS, and a pathway manager. In this embodiment, the managing device 105 perform the functions of the pathway manager, a BTS, and a DAS. FIG. 4 is another alternative wireless system arranged to operate in accordance with an exemplary embodiment of the present invention. In this embodiment, a BTS manager 107 is provided to perform the functions of a BTS and a pathway manager. FIG. 5 is yet another alternative wireless system arranged to operate in accordance with an exemplary embodiment of the present invention. In this embodiment, a DAS manager 109 is provided to perform the functions of a DAS and a pathway manager. FIG. 6 is still another alternative wireless system arranged to operate in accordance with an exemplary embodiment of the present invention. In this embodiment, a receiving manager 115 is provided to perform the functions of a receiver and a pathway manager. A processor may be present within the managing device 105, BTS manager 107, DAS manager 109, and receiver manager 115 in order to execute machine language instructions to fulfill the functions of a pathway manager.

According to an exemplary embodiment, the pathway manager function, whether implemented as a separate entity or as part of a BTS, a DAS, or a receiver identifies and selects which antenna element is optimally positioned to serve the receiver 114. The radiated energy from BTS 102 or wireless signal may then be radiated via the chosen antenna element. In one embodiment, all non-selected antennae within the system are disabled from transmitting wireless signals to receiver 114. BTS 102 or DAS 104 may, for example, disable the non-selected antennae by disabling a power source to the non-selected antennae after the pathway manager 106 has chosen a preferred antenna.

In another embodiment, DAS 104 is provided the transmission code (i.e., Walsh code and PN offset) of receiver 114 and BTS 102. DAS 104 may choose which antenna to power by transmitting the known Walsh code and PN offset to that antenna. The non-selected antennae will not know the specified Walsh code and PN offset of receiver 114, therefore, the non-selected antennae will be unable to transmit wireless signals to receiver 114. The non-selected antennae will be effectively disabled by not providing the specified Walsh code to the non-selected antennae. In this embodiment, the non-selected antennae are not powered down.

In a preferred embodiment, only one antenna element is chosen to transmit a wireless signal. Alternatively, two or more antennae may be chosen. The number of antennae chosen to transmit wireless signals may be dependent upon the particular signal being transmitted, the particular system in use, or other requirements of receiver 114. The optimal antenna element can be identified using several methods. Examples of such methods include identifying the optimal antenna element based on (i) reliability and probability of transmission by the antenna element, (ii) proximity of the antenna element to the receiver, (iii) incoming signal strength, and (iv) availability for use of the antenna element.

In one embodiment, the antennae element(s) is identified based on reliability and probability of transmission of a wireless signal. The optimal antenna to transmit the wireless signal may be the antenna having the highest probability of succeeding in transmitting the signal. The reliability of an antenna may be calculated based on a probability algorithm taking into account the number of successful and unsuccessful transmissions of wireless signals that each antenna has previously completed, and the performance characteristics of each antenna. For example, a new high performance and high power antenna may be more reliable than an older low power antenna.

The reliability of an antenna may also be determined based on a past performance of the antenna. For example, upon successful transmission of a wireless signal, the antenna may be placed into a "positive" group within the antenna database 156 of the pathway manager 106 of FIG. 2 and, upon unsuccessful transmission of a wireless signal, the antenna may be placed into a "negative" group within the antenna database 156. The pathway manager 106 may select antennae from the positive group in order to transmit a wireless signal because those antennae have operated properly in the past. The pathway manager 106 may access the antenna database 156 to determine past performances of antennae in order to make a decision. A reliable antenna may be preferred to transmit wireless signals in comparison to the unreliable antennae. The selection of a reliable antenna versus an unreliable antenna may be based upon the importance of receiving an error-free wireless signal at the receiver 114.

Figure 7:
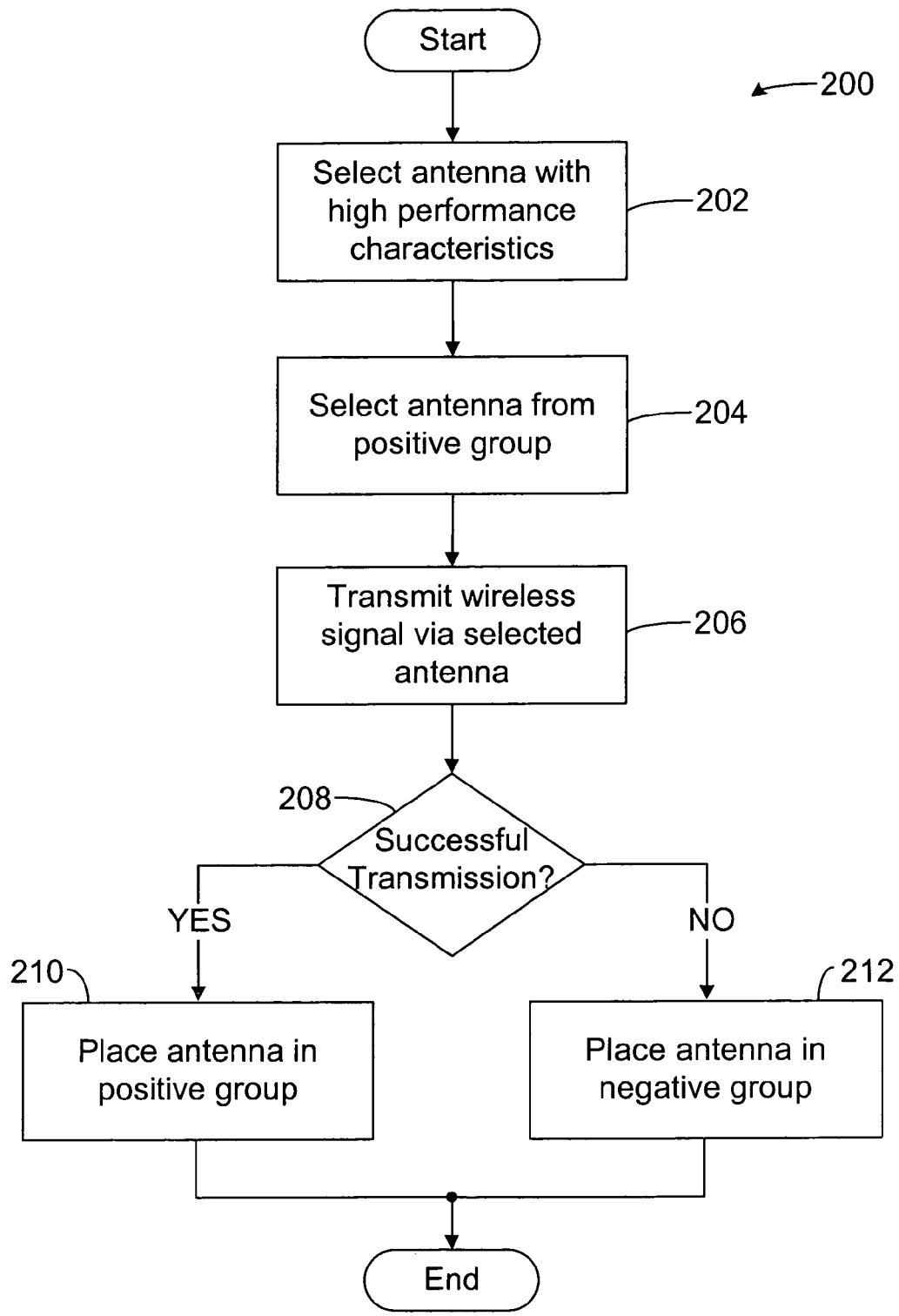
FIG. 7 is a control flow diagram illustrating an embodiment of identifying an antenna to transmit a wireless signal in accordance with an exemplary embodiment of the present invention.

FIG. 7 is a control flow diagram illustrating one identification embodiment of method 200 for identifying an antenna to transmit a wireless signal. The method 200 is performed by the pathway manager 106 or the entity performing the functions of the pathway manager 106. The pathway manager 106 may select an antenna with high performance characteristics as indicated at step 202. Examples of high performance characteristics may include high power capabilities, and lack of noise interference. The pathway manager 106 may then select an antenna from the positive group as indicated at step 204. The wireless signal may then be transmitted, as shown at step 206, by the selected antenna. The transmission may then be evaluated, for instance by monitoring a return signal from the receiver 114, as indicated at step 208. Upon successful transmission of the wireless signal, the antenna may be placed into the positive group as shown at step 210, and upon unsuccessful transmission of the wireless signal, the antenna may be placed into the negative group, as shown at step 212.

In another embodiment, the optimal antenna element is identified based on proximity of the antennae to the receiver. The optimal antenna to transmit the wireless signal may be the antenna closest to the receiver that is able to transmit a reliable signal. As the distance between the receiver 114 and the antenna element increases, the transmitted signal degrades in quality due to interference with other signals and fading of the strength of the transmitted signal. A wireless signal's strength will fade in transmission over large distances due to the imperfections of an air interface. Furthermore, an antenna with a clear line of sight may be optimal in comparison to an antenna with an obstructed view. An optical line of sight exists if an imaginary straight line can be drawn connecting the antenna element and the receiver 114. A clear line of sight exists when no physical objects obstruct the view of the antenna element to the receiver 114.

In FIG. 1, and FIGS. 3–6, the first antenna 108, the second antenna 110, and the third antenna 112 are located at distances D1, D2 and D3, respectively, from receiver 114. The optimal antenna to transmit the wireless signal may be the antenna closest in geographic proximity to receiver 114. For example, if D1 is greater than D2 and D2 is greater than D3, then D3 is the shortest distance to receiver 114, and the third antenna 112 may be the optimal antenna to transmit the wireless signal. The pathway manager 106 may identify the third antenna 112 as the closest antenna to receiver 114. Subsequently, the pathway manager 106 may identify the third antenna 112 as the optimal antenna and select the third antenna 112 to transmit the wireless signal to receiver 114.

Figure 8:
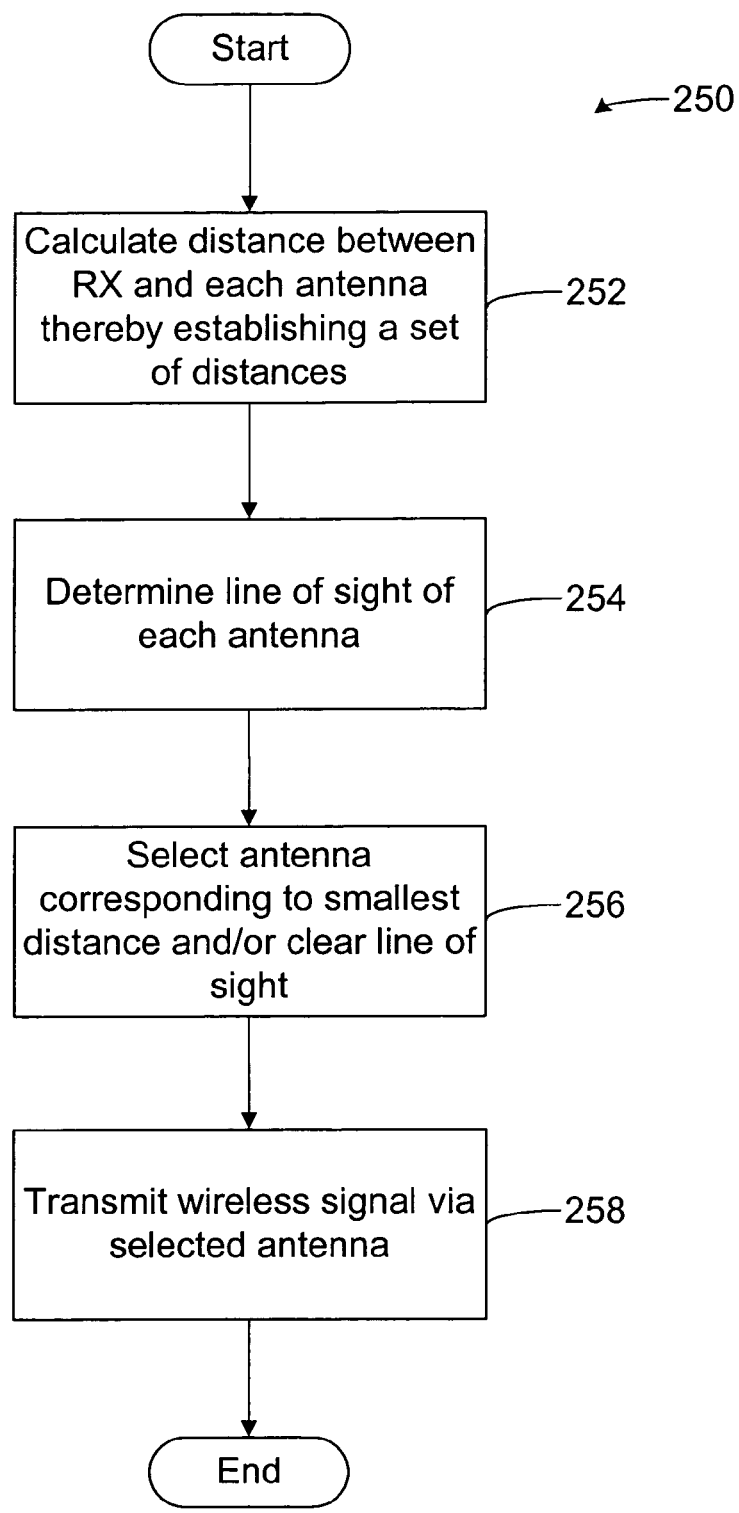
FIG. 8 is another control flow diagram illustrating an embodiment of identifying an antenna to transmit a wireless signal in accordance with an exemplary embodiment of the present invention.

FIG. 8 is a control flow diagram illustrating another method 250 of identifying an antenna to transmit a wireless signal in accordance with the wireless system of FIG. 1. The method 250 is performed by the pathway manager 106. The pathway manager 106 may first calculate distances between the receiver 114, and the first antenna 108, the second antenna 110, and the third antenna 112 thereby establishing a set of distances as indicated at step 252. The set of distances may be stored in the antenna database 156 within the pathway manager 106. The distances may be calculated based upon signal departure and arrival times to and from the receiver 114, or based upon angle of departure and arrival to and from the receiver 114 using triangulation and positioning of the antennae within the antenna system.

The pathway manager 106 may then determine a line of site of each antenna as shown at step 254. After compiling this data, the pathway manager 106 may select an antenna corresponding to the smallest distance within the set of distances and/or select an antenna with a clear line of sight as shown at step 256. In a preferred embodiment, the pathway manager 106 will select an antenna with the shortest distance, within the set of distances, and also with a clear line of sight. Therefore, in alternate embodiments, the preferred antenna may not be the antenna with the overall smallest distance. After selecting the antenna, the wireless signal may be transmitted via the selected antenna as shown at step 258.

Figure 9:
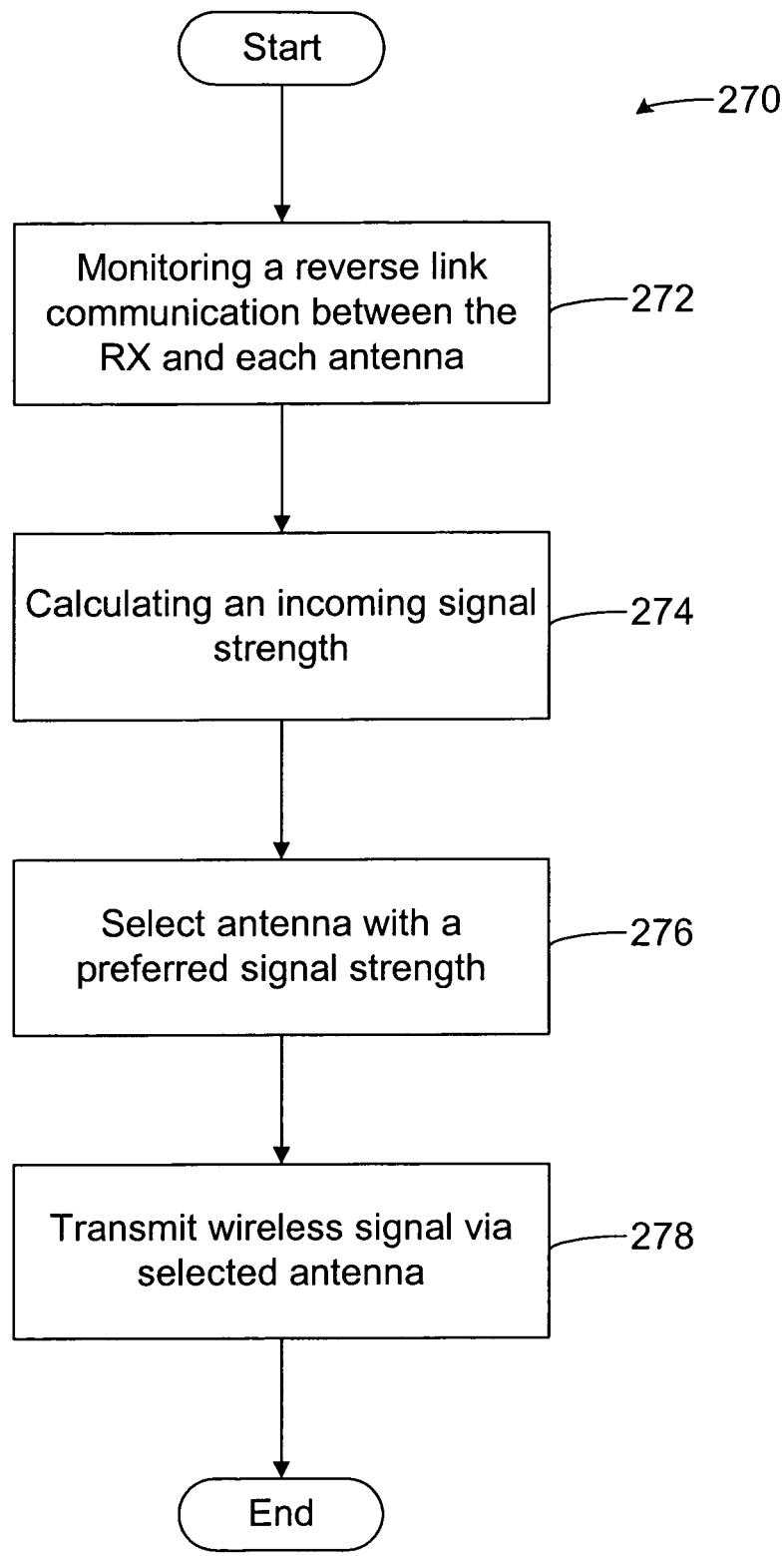
FIG. 9 is another control flow diagram illustrating an embodiment of identifying an antenna to transmit a wireless signal in accordance with an exemplary embodiment of the present invention.

In another embodiment, the antenna element is identified based on incoming signal strength. FIG. 9 is a control flow diagram illustrating an embodiment of a method 270 for identifying an antenna to transmit a wireless signal. Signal strength method 270 is performed by the pathway manager 106. The pathway manager 106 may monitor a reverse link communication (i.e., the air interface channels for communications from the receiver 114 to the BTS 102) to each antenna element as indicated at step 272. Monitoring may be done by observing a return signal from the receiver 114. The pathway manager 106 may then calculate an incoming signal strength as shown at step 274. The calculated signal strength may correspond to the strength of the signal received at the receiver 114.

In one embodiment, the signal strength is calculated by determining the energy of the desired pilot tone ($E_c$), and comparing this energy with the total energy received ($I_o$). The ratio $E_c/I_o$, energy versus spectral density, may be used as a determining factor in establishing acceptable wireless signal strengths. The ratio $E_c/I_o$ is a specific measurement of the energy of the pilot tone signal being measured to the total signal power in the channel and is typically measured in CDMA systems. The total signal power in the channel includes the pilot tone signal being measured, pilots from other BTSs, traffic and other channels from BTSs and noise. A ratio of one, (i.e., $E_c/I_o=1$, energy of desired pilot tone=total energy received) indicates that no noise is present in the channel. In practice, this may be unattainable, but using the ratio $E_c/I_o$, an acceptable standard or cutoff may be developed. For example, antennae with a ratio of 0.75 may be desired and accepted as optimal antennae.

After calculating the incoming signal strengths, the pathway manager 106 may select an antenna with a preferred signal strength as indicated at step 276. A preferred signal strength may be a pre-determined ratio of $E_c/I_o$. In another embodiment, a preferred signal strength is the strongest signal strength present corresponding to the largest ratio of $E_c/I_o$ present. Thereupon, the wireless signal may be transmitted via the selected antenna as indicated at step 278.

Figure 10:
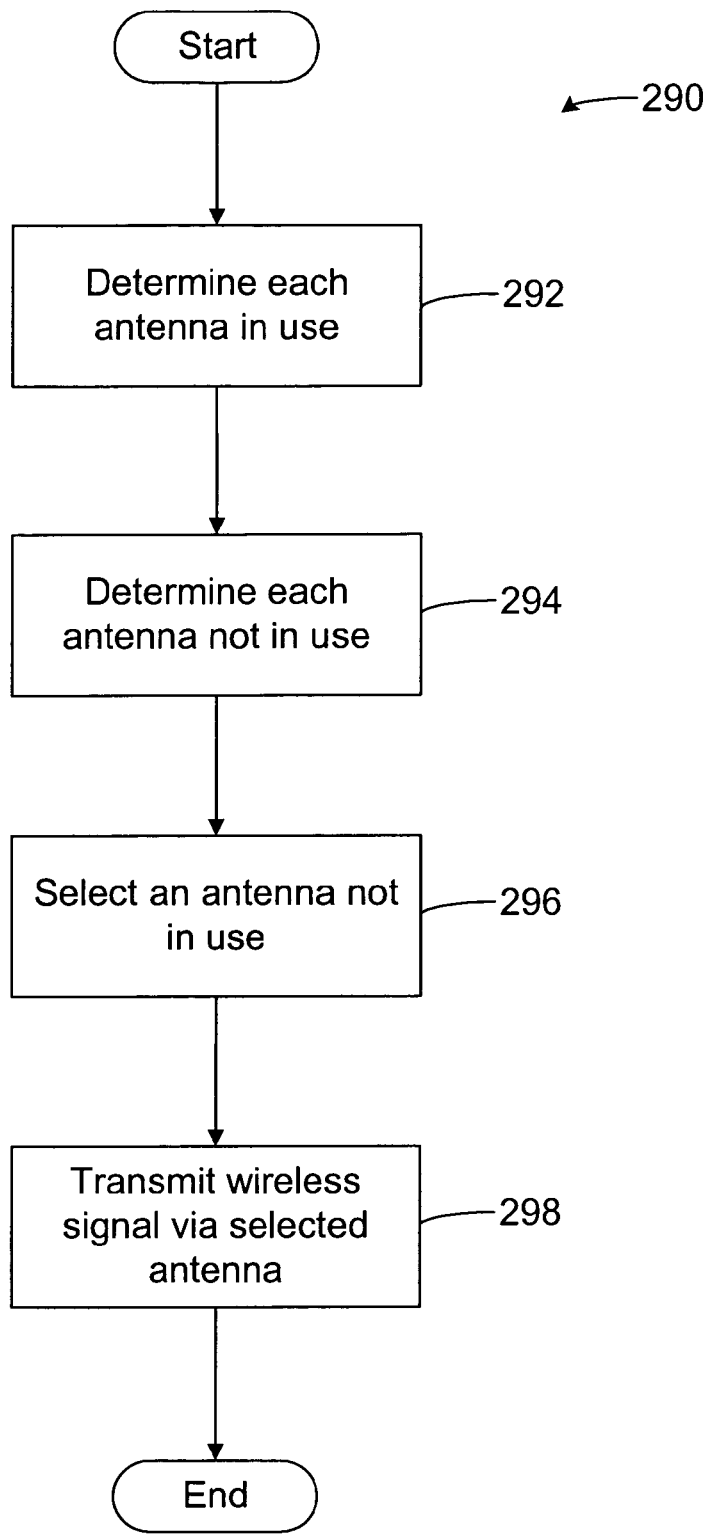
FIG. 10 is another control flow diagram illustrating an embodiment of identifying an antenna to transmit a wireless signal in accordance with an exemplary embodiment of the present invention.

In another embodiment, the antenna element is identified based on availability of use of the antennae. FIG. 10 is a control flow diagram illustrating a method 290 of identifying an antenna to transmit a wireless signal. The method 290 is performed by the pathway manager 106. The pathway manager 106 may determine which antennae are presently in use by the CDMA distributed antenna system as indicated at step 292. Following, the pathway manager 106 may determine which antennae are not currently in use by the CDMA distributed antenna system as indicated at step 294. Determining the availability of the antennae may be done by monitoring the coaxial cables carrying information from DAS 104 to the first antenna 108, the second antenna 110, and the third antenna 112. An antenna may not be in use if no data information is detected on the coaxial cables. DAS 104 may recognize the length of a signal being transmitted. DAS 104 may then be able to determine when an antenna will become available. Additionally, antennae may also transmit signals to DAS 104 indicating their availability. The pathway manager may select an antenna not currently in use as indicated at step 296. Any antenna not currently in use may be an optimal antenna for use. Lastly, the wireless signal may be transmitted to a receiver via the selected available antenna as indicated at step 298.

In a preferred embodiment, the pathway manager 106 identifies and selects an optimal antenna to transmit a wireless signal based on many factors in combination. For example, the pathway manager 106 may select an optimal antenna based on reliability, proximity to the receiver, signal strength, and availability either separately or in combination. The factors that are considered may depend upon the type of antenna system in use or the factors considered may depend upon the importance of the wireless signal reliably arriving at receiver 114. In a preferred embodiment, the proximity of the antenna is a factor always considered upon selecting an optimal antenna. The proximity of the antenna may affect other factors such as reliability and signal strength.

In one embodiment, the pathway manager 106 selects an antenna based on reliability and proximity. The pathway manager 106 may select antennae from the positive group, and then select an antenna based on proximity which is in the positive group. Alternatively, the pathway manager may select an antenna based on proximity and following select an antenna from the positive group. An antenna may be selected from the negative group if the antenna is identified as closer in proximity to receiver 114. Upon successful transmission of a wireless signal, the antenna may be placed into the positive group. This may enable antennae to change categories within the reliable antenna method 200 of FIG. 7.

The pathway manager 106 may identify and select an optimal antenna to transmit a wireless signal at many different time periods. In one embodiment, the pathway manager 106 determines a separate optimal antenna to transmit each individual wireless signal present at BTS 102. This may correspond to a real-time allocation of the antennae in a distributed antenna system. The optimal antenna chosen may be the same for a group of signals or each signal may be transmitted using a different antenna. The optimal antenna chosen will be based upon proximity to a receiver, availability of use, expected transmission signal strength, and reliability of antennae.

In another embodiment, the pathway manager 106 identifies an optimal antenna for a given receiver and transmits all signals to the given receiver using the identified optimal antenna during a specified time period. After the time period, the pathway manager 106 may again identify an optimal antenna for the given receiver. If the receiver has not changed positions, then the optimal antenna may be the same, although the optimal antenna may now be in use and unavailable which may cause the pathway manager 106 to select an alternate optimal antenna. In still another embodiment, the pathway manager 106 may identify and select an optimal antenna for each individual wireless signal to be transmitted to the receiver 114. Still other variations exist as well.

An optimal antenna may be identified manually for a stationary receiver. For instance in FIG. 1, an antenna 108 may be selected based on proximity to a stationary receiver 114 and the antenna 108 may be identified as the antenna 108 to transmit wireless signals to receiver 114. All wireless signals sent to receiver 114 will have been transmitted by antenna 108. Since the receiver 114 is stationary, the optimal antenna 108 based on proximity will remain the same. Alternatively, selecting an optimal antenna based on additional criteria may require the pathway manager 106 to identify and select the antenna according further limitations. Using additional criteria may require the pathway manager 106 to select a new antenna to transmit wireless signals to the receiver 114.

In another embodiment, a method of optimizing transmission of wireless signals in a CDMA distributed antenna system is provided. In FIG. 1, the first antenna 108, the second antenna 110, and the third antenna 112 are configured to transmit wireless signals to the receiver 114. The pathway manager 106 may assign each antenna to a different receiver. Only one antenna may be assigned for one receiver. The pathway manager 106 may assign an antenna to a receiver based on geographic proximity of the antenna to the receiver. Furthermore, the pathway manager 106 may assign an antenna to a receiver based on additional criteria such as availability of use, expected transmission signal strength, and reliability of transmitting a wireless signal. After assignment, the wireless signals may be transmitted by the antenna. The distribution of the antennae may be optimal to allow for a maximum amount of wireless signals to be transmitted simultaneously.

Typically, each BTS in a CDMA distributed antenna system has a unique PN offset. The PN offset specifies a particular code identifying signals sent from a particular BTS. Each pilot signal has a unique PN offset which can be one of 512 possible values. The receiver 114 may choose a BTS 102 and "lock" to that BTS 102, accepting its PN offset at "face value" and interpreting all other PN offsets by comparison to the accepted PN offset. The pilots are identified by their PN offset assignments. Propagation delay due to distances of the antenna to the receiver 114 may skew the apparent PN offsets of all other sectors, making the PN offset seem earlier or later than expected.

Referring to FIG. 1 and FIGS. 3–6, the first antenna 108, and the second antenna 110 may be located at distances D1 and D2 respectively from the antenna 116 of receiver 114.

For illustration purposes, suppose D2 is greater than D1, and suppose D2 corresponds to 33 chips of distance and D1 corresponds to 4 chips of distance. If the receiver 114 locks to the second antenna 110, the wireless signal transmitted from the first antenna 108 will appear 29 chips earlier than expected at receiver 114. Alternatively, if the receiver 114 locks to the first antenna 108, the wireless signal transmitted from the second antenna 110 will appear 29 chips later than expected at receiver 114.

Within FIG. 1, the pathway manager 106 may identify and select the first antenna 108 to transmit a first wireless signal from a first BTS for the receiver 114. Subsequently, the pathway manger 106 may select the second antenna 110 to transmit a second wireless signal from a second BTS for the receiver 114. The receiver 114 may be locked to the first antenna 108 because the first antenna 108 was initially allocated for receiver 114. However, the second wireless signal may arrive at receiver 114 before the first wireless signal due to differences in travel path and travel distances. The receiver 114 may misinterpret the second wireless signal due to a difference in PN offsets. All BTSs employ the same PN sequence each with a different time shift from the other. The apparent misinterpretation due to signal arrival times is adjacent PN offset interference. The two pilots with adjacent PN offsets, due to propagation delay and travel path difference, may arrive at receiver 114 within a short time shift from one another. In a CDMA system, this causes the receiver 114 to think that the two pilot signals are a result of multi-path signaling of the same signal, and hence receiver 114 combines the two signals leading to a corrupted signal.

The receiver 114 may realize that the second antenna 110 has a stronger pilot and that the second wireless signal will arrive first at the receiver 114. The receiver 114 may then compensate for the apparent PN offset differences and adjust the incoming wireless signals accordingly. In this aspect, the invention is not limited to the scenario where the PN offsets are the same for each antenna element or each wireless signal transmitted. Still other variations are possible as well.

In one aspect of the present invention, the use of one antenna within a distributed antenna system to transmit a wireless signal reduces the power requirements necessary from BTS 102 to transmit a wireless signal. Instead of powering multiple antennae to transmit a wireless signal, only one antenna may be powered to transmit the signal. The amount of power necessary to drive one antenna is less than the amount of power necessary to drive multiple antennae. Thus, the amount of energy needed to drive the antennae may be reduced. The radiated wireless signal from the selected antenna will be effective, even though only one antenna is transmitting the wireless signal.

As previously mentioned, the present invention may be used in combination with coverage into long road and rail tunnels, underground passageways, inside buildings and offices as well as other areas normally inaccessible to radio frequency (RF) wireless signals. However, the present invention is not limited to RF inaccessible distributed antenna systems. Furthermore, the present invention is not limited for use in a CDMA distributed antenna system. It can extend as well to other distributed antenna systems.

Certain exemplary embodiments of the present invention have been illustrated and described above. It will be understood by one of ordinary skill in the art, however, that changes and modifications may be made to the embodiments shown without departing from the scope of the invention, as defined by the following claims. Further, the claims should not be read as limited to the described order of elements unless stated to that effect. Therefore, all embodiments that come within the scope and spirit of the following claims and equivalents thereto are claimed as the invention.

We claim:

1. A method for transmitting wireless signals in a CDMA distributed antenna system, the method comprising the steps of:
   providing a plurality of antennas, where each antenna is configured to transmit a wireless signal to a receiver;
   identifying one of the plurality of antennas to transmit the wireless signal to the receiver by selecting the one of the plurality of antennas based on a geographic proximity to the receiver, wherein selecting the one of the plurality of antennas based on the geographic proximity to the receiver includes (i) calculating a distance between each one of the plurality of antennas and the receiver thereby establishing a set of distances, and (ii) selecting one of the plurality of antennas corresponding to the smallest distance among the set of distances; and
   transmitting the wireless signal by the one of the plurality of antennas to the receiver.

2. The method of claim 1, further comprising:
   collecting and storing reliability data for transmissions from each of the plurality of antennas to the receiver; and
   selecting one of the plurality of antennas based on the stored reliability data.

3. The method of claim 1, wherein the step of identifying the one of the plurality of antennas further comprises the steps of:
   monitoring a reverse communication link between the receiver and each one of the plurality of antennas thereby determining a signal strength of each incoming reverse communication link at each antenna; and
   selecting one of the plurality of antennas based upon the signal strength of the reverse communication link.

4. The method of claim 3, wherein the step of selecting one of the plurality of antennas based upon the signal strength of the reverse communication link further comprises the step of selecting one of the plurality of antennas where the signal strength of the reverse communication link meets a preferred signal strength.

5. The method of claim 1, wherein the step of identifying the one of the plurality of antennas includes the step of determining the availability of the plurality of antennas, wherein an available antenna is an antenna not currently in use.

6. The method of claim 5, wherein the step of identifying the one of the plurality of antennas includes selecting one of the plurality of antennas based on the availability of each one of the plurality of antennas.

7. A CDMA distributed antenna system comprising in combination:
   a plurality of antennas, where each antenna is configured to transmit a wireless signal;
   a pathway manager coupled to the plurality of antennas, the pathway manager configured to identify one of the plurality of antennas to transmit the wireless signal by selecting the one of the plurality of antennas based on a geographic proximity to the receiver, wherein the pathway manager identifies the one of the plurality of antennas by calculating a distance between each antenna and the receiver thereby establishing a set of distances and selecting the one of the plurality of antennas corresponding to the smallest distance among the set of distances; and
   a receiver configured to receive the wireless signal transmitted by the one of the plurality of antennas.

8. The system of claim 7, wherein the pathway manager is a device selected from the group consisting of a base transceiver station (BTS), a distributed antenna system controller (DAS), and the receiver.

9. The system of claim 7, wherein the pathway manager identifies the one of the plurality of antennas by monitoring a reverse link communication between the receiver and each antenna thereby determining signal strengths of incoming wireless signals at each antenna.

10. The system of claim 9, wherein the pathway manager selects the one of the plurality of antennas with a preferred signal strength.

11. The system of claim 7, wherein the pathway manager identifies the one of the plurality of antennas by selecting the one of the plurality of antennas based on an availability of the plurality of antennas, wherein an available antenna is an antenna not currently in use.

* * * * *